US010725732B2

(12) United States Patent
Oh et al.

(10) Patent No.: US 10,725,732 B2
(45) Date of Patent: Jul. 28, 2020

(54) DISPLAY DEVICE AND OPERATING METHOD THEREOF

(71) Applicant: LG ELECTRONICS INC., Seoul (KR)

(72) Inventors: Hyojung Oh, Seoul (KR); Seunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 537 days.

(21) Appl. No.: 15/136,662

(22) Filed: Apr. 22, 2016

(65) Prior Publication Data

US 2017/0235461 A1    Aug. 17, 2017

(30) Foreign Application Priority Data

Feb. 15, 2016    (KR) .................. 10-2016-0017467

(51) Int. Cl.
*G06F 3/16*    (2006.01)
*G06F 3/0482*    (2013.01)
(Continued)

(52) U.S. Cl.
CPC ............ *G06F 3/167* (2013.01); *G06F 3/0346* (2013.01); *G06F 3/0482* (2013.01); *G06F 3/165* (2013.01);
(Continued)

(58) Field of Classification Search
CPC ..... G06F 3/04842; G06F 3/167; G09G 5/003; G09G 2370/20; G09G 2354/00
See application file for complete search history.

(56) References Cited

U.S. PATENT DOCUMENTS 5,543,857 A    8/1996    Wehmeyer et al.
5,740,436 A    4/1998    Davis et al.
(Continued)

FOREIGN PATENT DOCUMENTS

JP    2001-128280 A    5/2001
KR    10-2008-0095126 A    10/2008
KR    10-2015-0131896 A    11/2015

OTHER PUBLICATIONS

AVForums, "Denon AVR-X2000 and LG 55LN5700 HDMI CEC / ARC issue", (Mar. 31, 2014), <URL https://www.avforums.com/threads/denon-avr-x2000-and-lg-55ln5700-hdmi-cec-arc-issue.1869608/>, p. 1-21 (Year: 2014).*
(Continued)

*Primary Examiner* — Ajay M Bhatia
*Assistant Examiner* — Mong-Shune Chung
(74) *Attorney, Agent, or Firm* — Birch, Stewart, Kolasch & Birch, LLP

(57) ABSTRACT

A display device including a display; a first external device interface configured to receive an image signal and an audio signal output from a first external input device; a second external device interface configured to receive an image signal and an audio signal output from a second external input device; and a controller configured to display a graphic user interface including a first external input item describing at least one of the first external device interface and the first external input device connected to the display device via the first external device interface, a second external input item describing at least one of the second external device interface and the second external input device connected to the display device via the first external device interface, a first audio output menu for selecting at least one of a plurality of audio output devices for outputting audio included in the audio signal received from the first external input device, and a second audio output menu for selecting at least one of
(Continued)

a plurality of audio output devices for outputting audio included in the audio signal received from the second external input device.

14 Claims, 15 Drawing Sheets

(51) Int. Cl.
  *G06F 3/0346* (2013.01)
  *G09G 5/00* (2006.01)
(52) U.S. Cl.
  CPC ......... *G09G 5/003* (2013.01); *G09G 2354/00* (2013.01); *G09G 2370/20* (2013.01)

(56) References Cited

U.S. PATENT DOCUMENTS

| | | |
|---|---|---|
| 2006/0046656 A1 | 3/2006 | Yang |
| 2006/0069458 A1 | 3/2006 | Lee et al. |
| 2011/0035773 A1 | 2/2011 | Stecyk et al. |
| 2011/0310308 A1 | 12/2011 | Asayama et al. |
| 2012/0219158 A1 | 8/2012 | Park |
| 2016/0073197 A1* | 3/2016 | Hammer ............... H04W 12/04 381/80 |

OTHER PUBLICATIONS

Carney, "SkreensTV wants to turn your TV into a multi-screen content-streaming machine", (Nov. 13, 2014), <URL https://pando.com/2014/11/13/skreenstv-wants-to-turn-your-tv-into-a-multi-screen-content-streaming-machine/>, p. 1-4 (Year: 2014).*

Sony Help Guide, "Selecting simultaneous audio output to a TV speaker and the headphones", (Jan. 14, 2015), <URL http://helpguide.sony.net/mdr/hw700ds/v1/en-us/contents/03/04/09/09.html/>, p. 1-2 (Year: 2015).*

Kritsonis, "Several sources, one TV: Skreens lets you surf while you watch while you play", (Sep. 22, 2015), <URL https://www.digitaltrends.com/home-theater/skreenz-kickstarter-puts-multiple-sources-on-tv-screen-at-once/>, p. 1-3 (Year: 2015).*

NickTheTechGuru, "Logitech Harmony 650 Remote Setup", (Dec. 25, 2013),<URL https://www.youtube.com/watch?v=dgPTEyYZY40/ >, p. 1-12 (Year: 2013).*

AVForums, "Denon AVR-X2000 and LG 55LN5700 HDMI CEC / ARC issue", (Mar. 31, 2014), <URL https:www.avforums.com/threads/denon-avr-x2000-and-lg-55ln5700-hdmi-cec-arc-issue.1869608/ >, p. 1-22 (Year: 2014).*

AVForums, "Denon AVR-X2000 and LG 55LN5700 HDMI CEC / ARC issue", (Mar. 31, 2014), <URL https:www.avforums.com/threads/denon-avr-x2000-and-lg-55ln5700-hdmi-cec-arc-issue.1869608/ >, p. 1-28 (Year: 2014).*

* cited by examiner

FIG. 8A
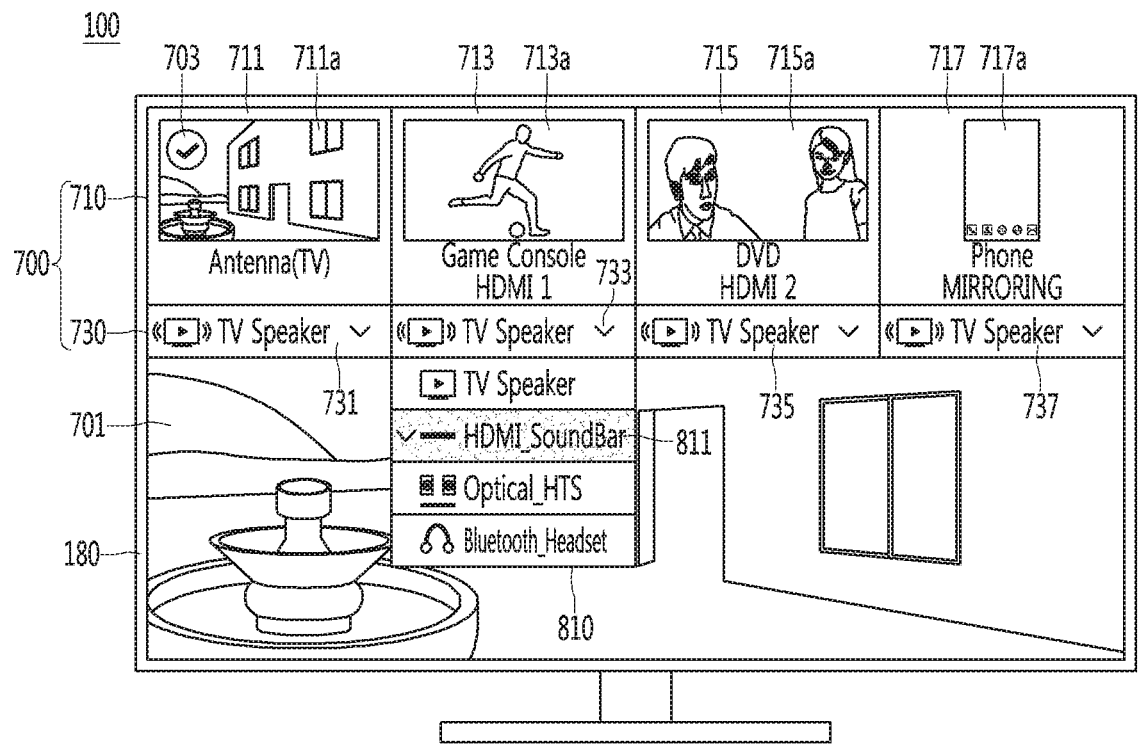
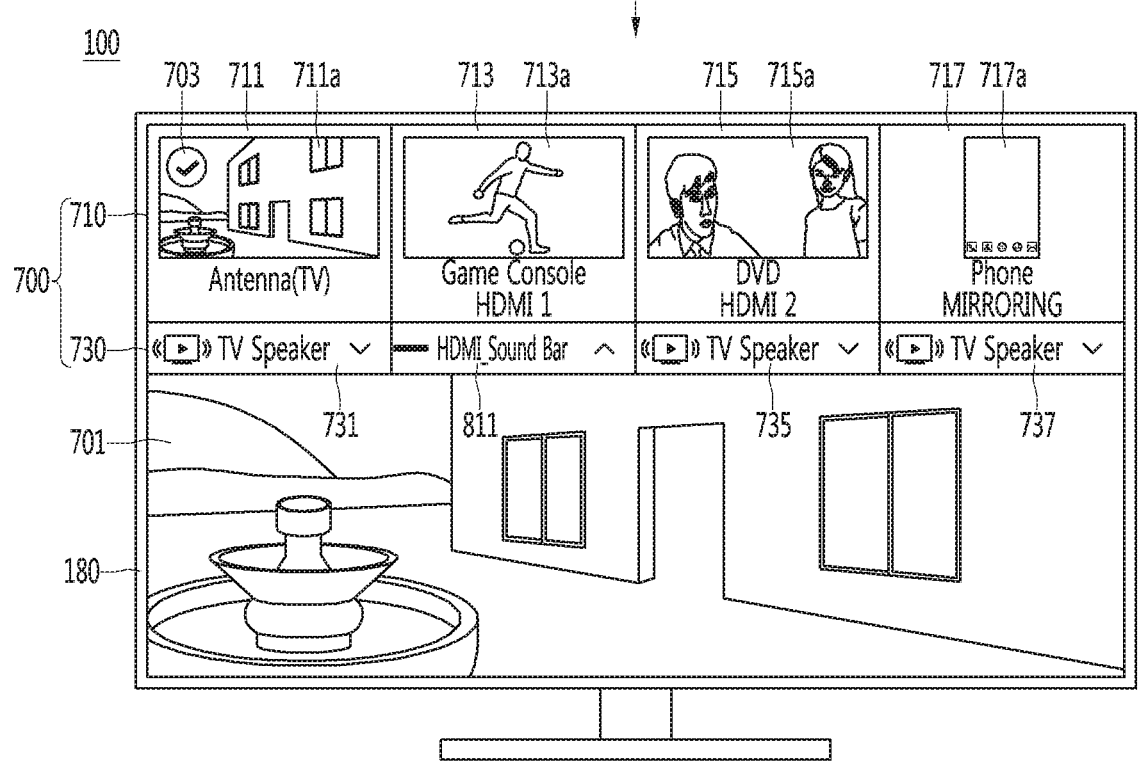

FIG. 8B
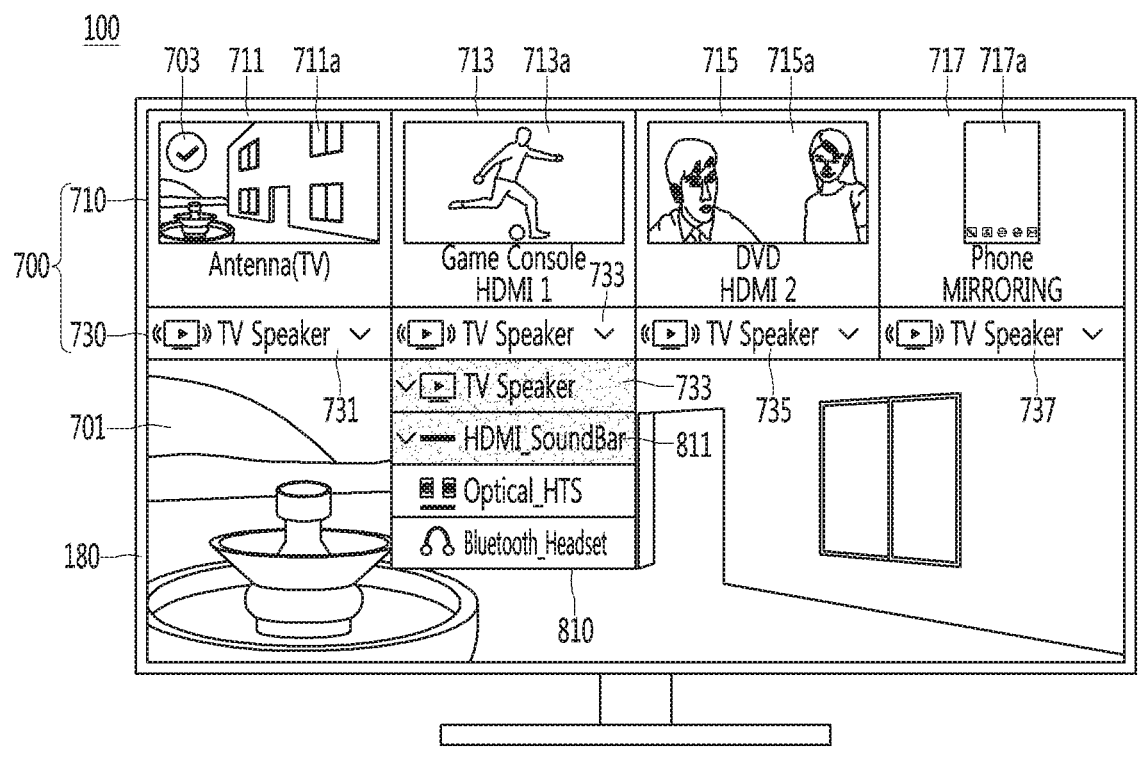
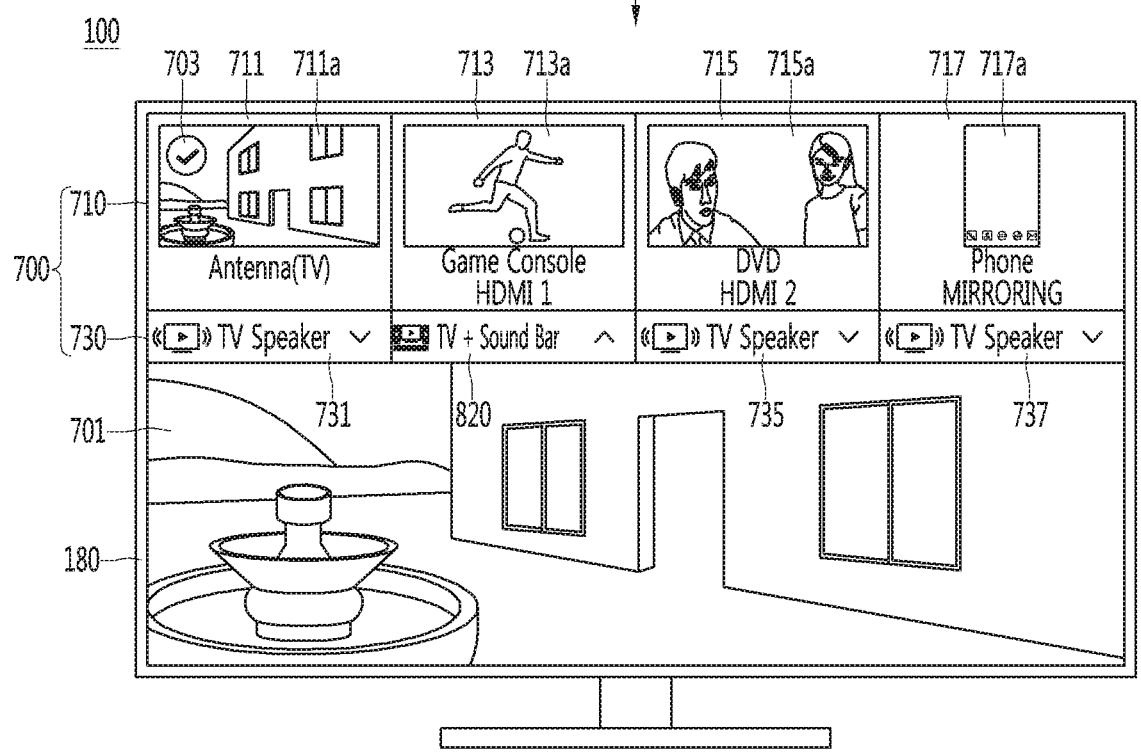

FIG. 10
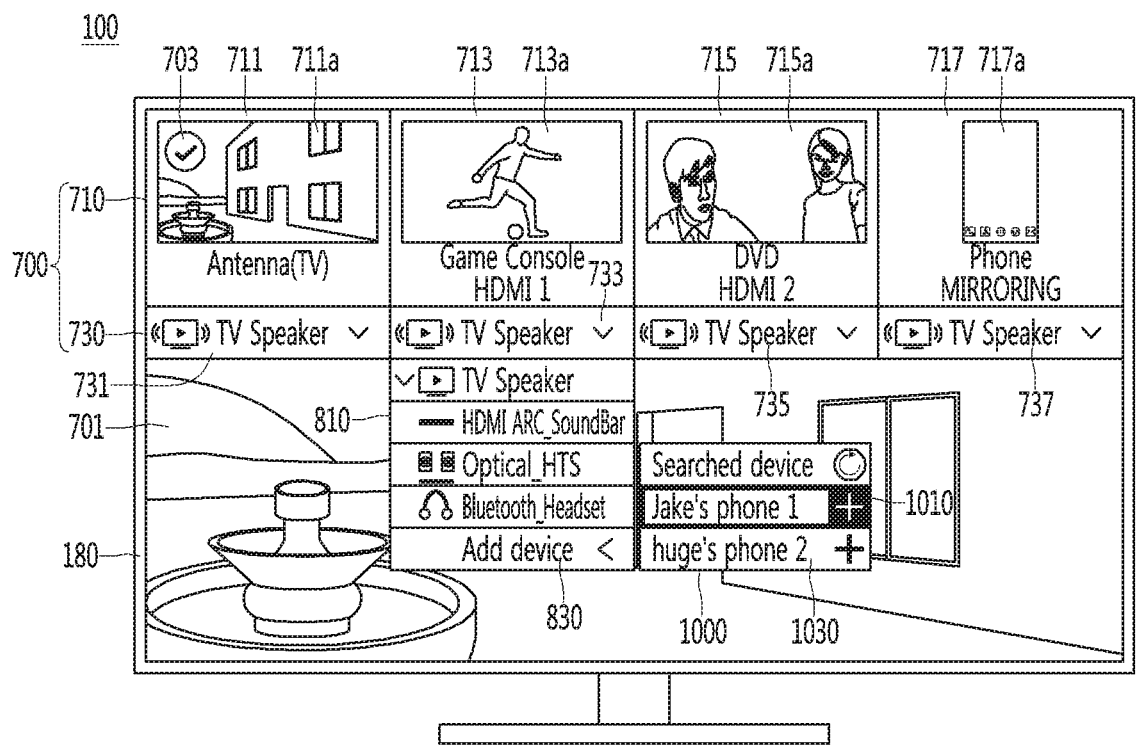
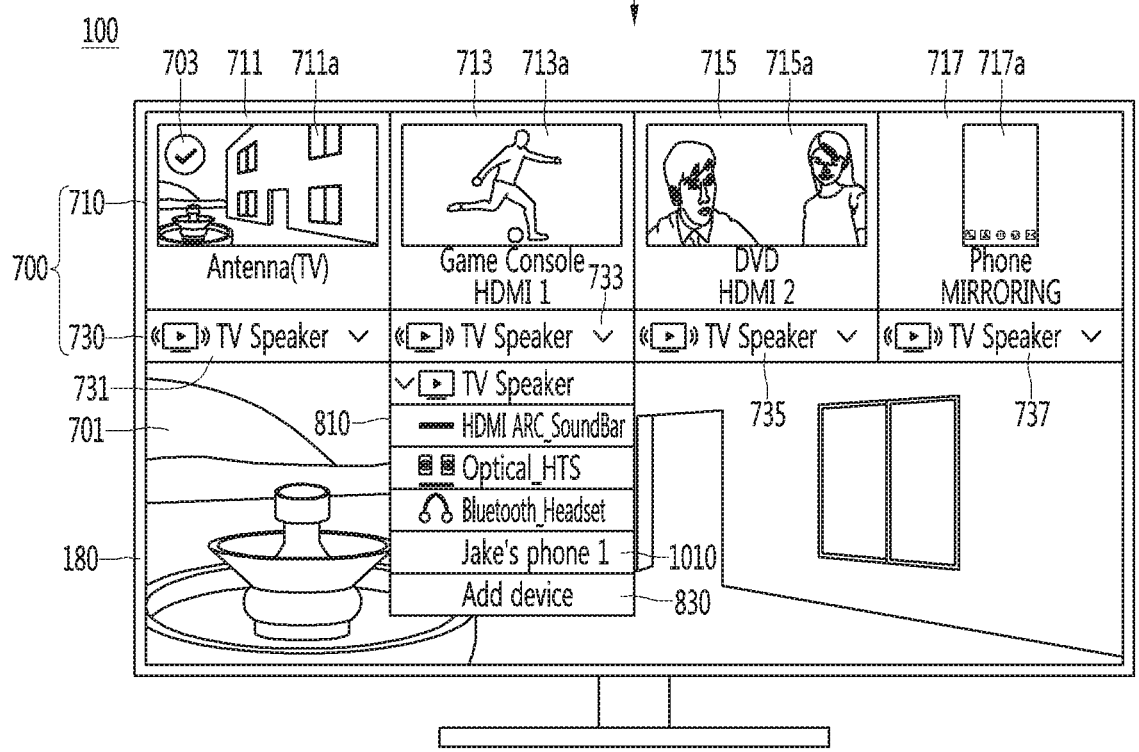

DISPLAY DEVICE AND OPERATING METHOD THEREOF

CROSS-REFERENCE TO RELATED APPLICATIONS

The present application claims priority under 35 U.S.C. § 119 and 35 U.S.C. § 365 to Korean Patent Application No. 10-2016-0017467 (filed on Feb. 15, 2016), which is hereby incorporated by reference in its entirety.

BACKGROUND OF THE INVENTION

Field of the Invention

The present disclosure relates to a display device and an operating method thereof.

Discussion of the Background Art

Digital TV services using wired or wireless communication networks are becoming common. The digital TV services can provide various services that conventional analog broadcasting services cannot provide. For example, Internet Protocol Television (IPTV) and smart TV services, that is, types of digital TV services, provide interactivity that allows users to actively select the types, watching times, and so on of watching programs. The IPTV and smart TV services can provide various additional services, for example, internet search, home shopping, and online game, based on such interactivity.

Further, recently, an image on an external device connected to a display device can be viewed through the large screen of the display device by using a list. However, in relation to a typical display device, if an external input item is selected from a list, the audio of the external input corresponding to the selected external input item is output through only a speaker provided to the display device, so that it is not able to provide an optimized sound to a user.

SUMMARY OF THE INVENTION

Embodiments provide a method of setting an audio output device corresponding to an external input and outputting the audio of the external input to the set audio output device to match user's preference.

In one embodiment, a display device includes: a display unit configured to display a list including a plurality of external input items; an external device interface unit configured to receive at least one of an image signal and an audio signal output from an external input device; and a control unit configured to control the display unit and the external device interface, wherein the control unit receives a command for selecting one from the plurality of external input items, and transmits, to an audio output device corresponding to the selected external input item, an audio signal input from an external input device corresponding to the selected external input item according to the received command.

In another embodiment, an operating method of a display device includes: displaying a list including a plurality of external input items; receiving a command for selecting one from the plurality of external input items; and transmitting, to an audio output device corresponding to the selected external input item, an audio signal input from an external input device corresponding to the selected external input item according to the received command.

The details of one or more embodiments are set forth in the accompanying drawings and the description below.

Other features will be apparent from the description and drawings, and from the claims.

BRIEF DESCRIPTION OF THE DRAWINGS

FIGS. 8A and 8B are views illustrating a process for setting an audio output item corresponding to an external input item according to an embodiment of the present invention.

FIG. 10 is a view illustrating a process for registering a new audio output device disposed around a display device according to an embodiment of the present invention.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
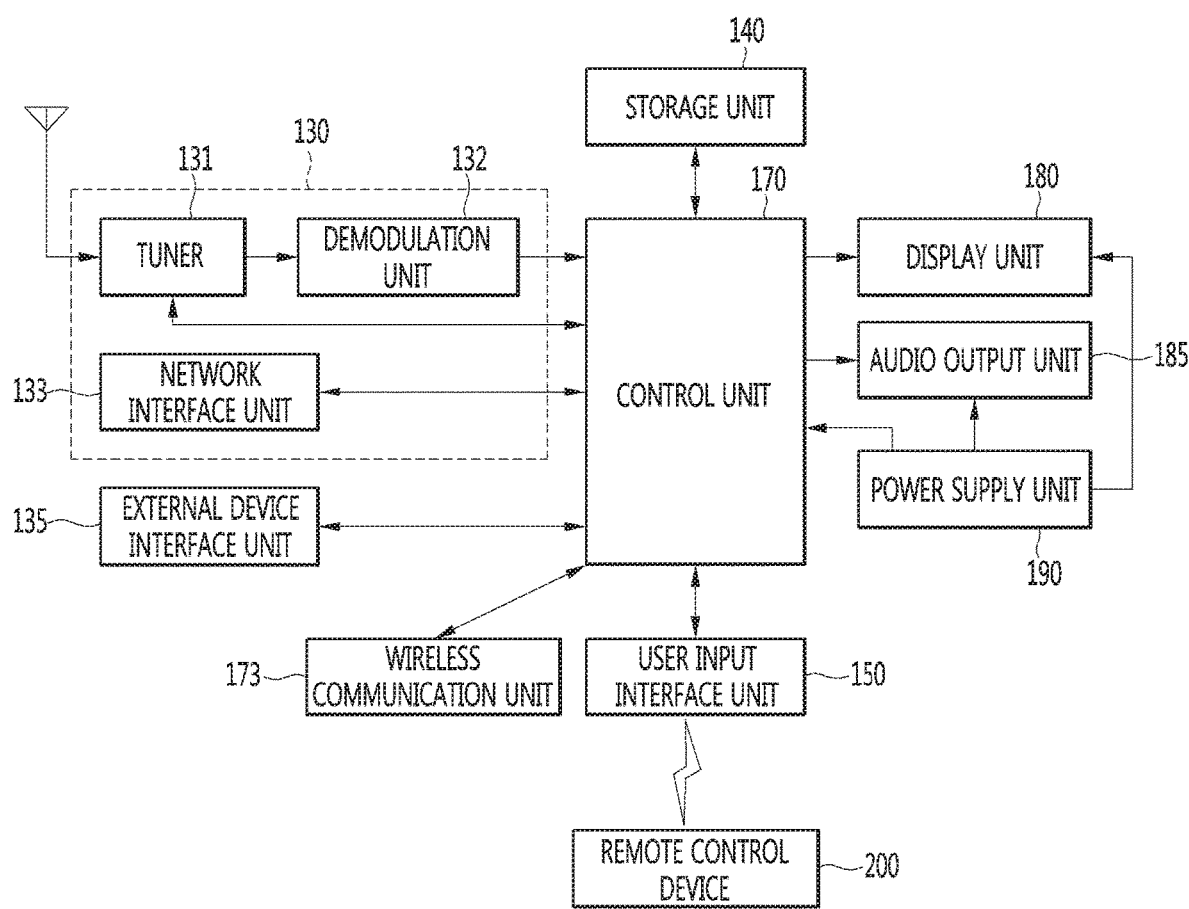
FIG. 1 is a block diagram illustrating a configuration of a display device according to an embodiment of the present invention.

FIG. 1 is a block diagram illustrating a configuration of a display device according to an embodiment of the present invention. Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133. The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form. The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio output from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185. An external device connectable to the external device interface unit 130 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

In addition, some content data stored in the display device 100 can be transmitted to a user or an electronic device, which is selected from other users or other electronic devices pre-registered in the display device 100. The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Further, the network interface unit 133 can receive firmware update information and update files provided from a network operator and transmit data to an internet or content provider or a network operator. The network interface unit 133 can select and receive a desired application among applications open to the air, through network.

The storage unit 140 can store signal-processed image, voice, or data signals stored by a program in order for each signal processing and control in the control unit 170. Additionally, the storage unit 140 can perform a function for temporarily store image, voice, or data signals output from the external device interface unit 135 or the network interface unit 133 and can store information on a predetermined image through a channel memory function. The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user. The user input interface unit 150 can deliver signals input from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

In addition, the user input interface unit 150 can deliver, to the control unit 170, control signals input from local keys such as a power key, a channel key, a volume key, and a setting key. Image signals that are image-processed in the control unit 170 can be input to the display unit 180 and displayed as an image corresponding to corresponding image signals. Further, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135. Besides that, the control module 170 can control overall operations in the display device 100.

Further, the control unit 170 can control the display device 100 by a user command or internal program input through the user input interface unit 150 and download a desired application or application list into the display device 100 in access to network. The control unit 170 can output channel information selected by a user together with processed image or voice signals through the display unit 180 or the audio output unit 185.

In addition, according to an external device image playback command received through the user input interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this instance, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The wireless communication unit 173 can be provided separated from the external device interface unit 135 and can be included in the external device interface unit 135. The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100. That is, if necessary, two or more components can be integrated into one component or one component can be divided into two or more components and configured. Further, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132. For example, the display device 100 can be divided into an image processing device such as a set-top box for receiving broadcast signals or contents according to various network services and a content playback device for playing contents input from the image processing device.

In this instance, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
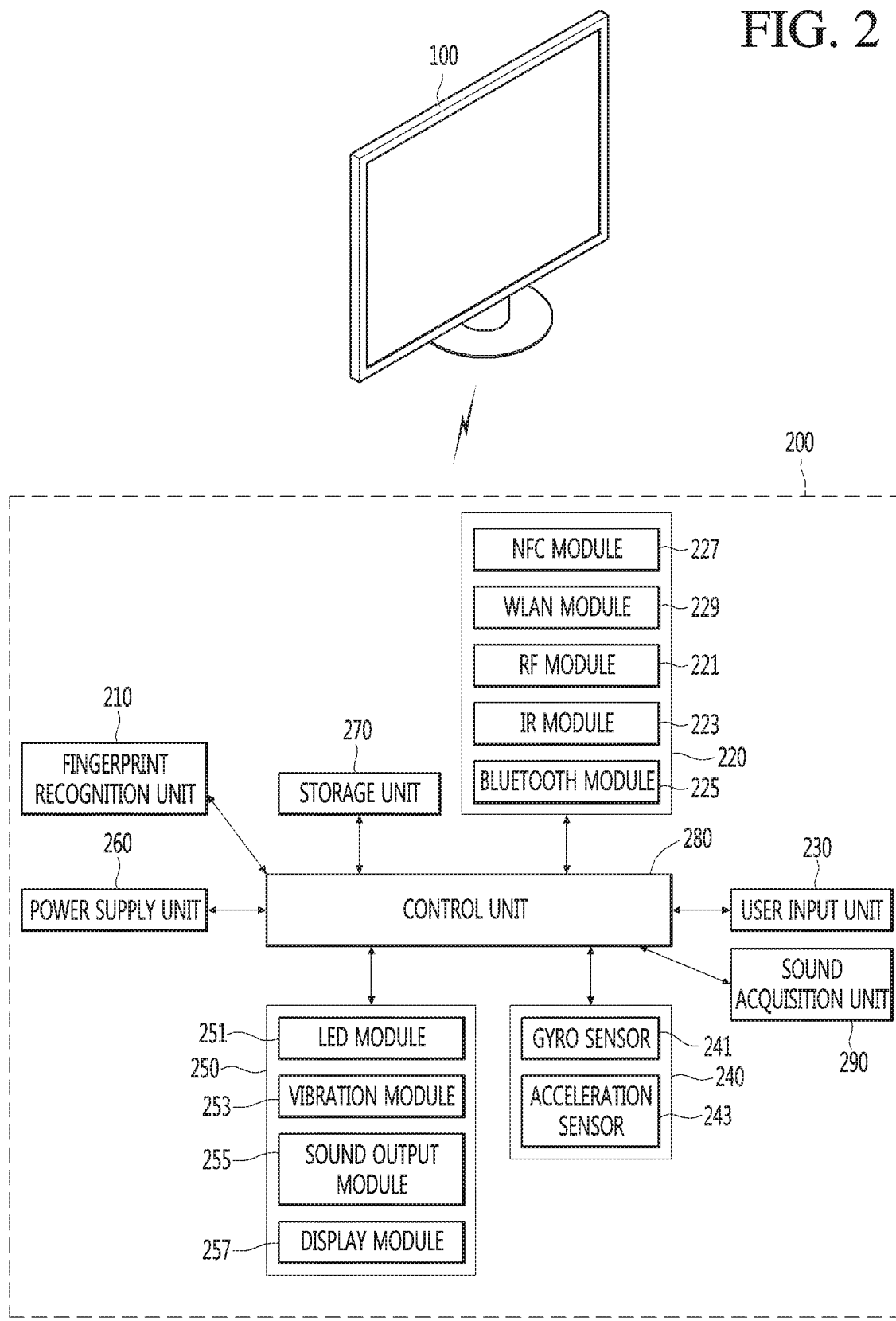
FIG. 2 is a block diagram illustrating a remote control device according to an embodiment of the present disclosure.
Figure 3:
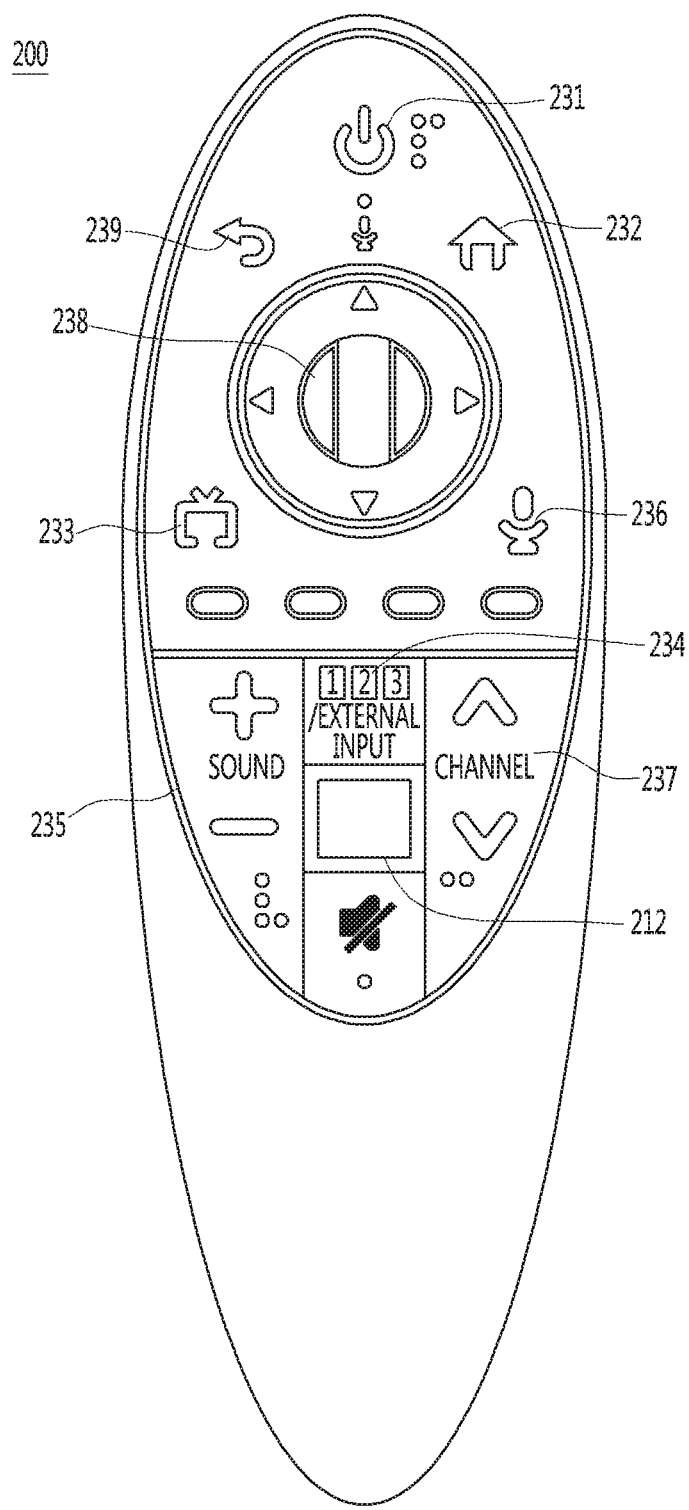
FIG. 3 is a view illustrating an actual configuration of a remote control device according to an embodiment of the present disclosure.

Then, referring to FIGS. 2 and 3, a remote control device is described according to an embodiment of the present invention. In particular, FIG. 2 is a block diagram illustrating a remote control device according to an embodiment of the present invention, and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290. The wireless communication unit 225 transmits/receives signals to/from an arbitrary any one of display devices according to the above-mentioned embodiments of the present invention.

The remote control device 200 can also include an RF module 221 for transmitting/receiving signals to/from the display device 100 according to the RF communication standards and an IR module 223 for transmitting/receiving signals to/from the display device 100 according to the IR communication standards.

In addition, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Further, the remote control device 200 can transmit signals containing information on a movement of the remote control device 200 to the display device 100 through the wireless communication unit 220. Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs.

The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described. If the user input unit 230 includes a touch screen, a user can touch a soft key of the touch screen to input a command relating to the display device 100 to the remote control device 200. In addition, the user input unit 230 can include various kinds of input mechanisms manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200. For example, the gyro sensor 241 can sense information on an operation of the remote control device 200 based on x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it. The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

In addition, the voice acquisition unit 290 of the remote control device 200 can obtain voice. The voice acquisition unit 290 can include at least one microphone 291 and obtain voice through the microphone 291.

Figure 4:
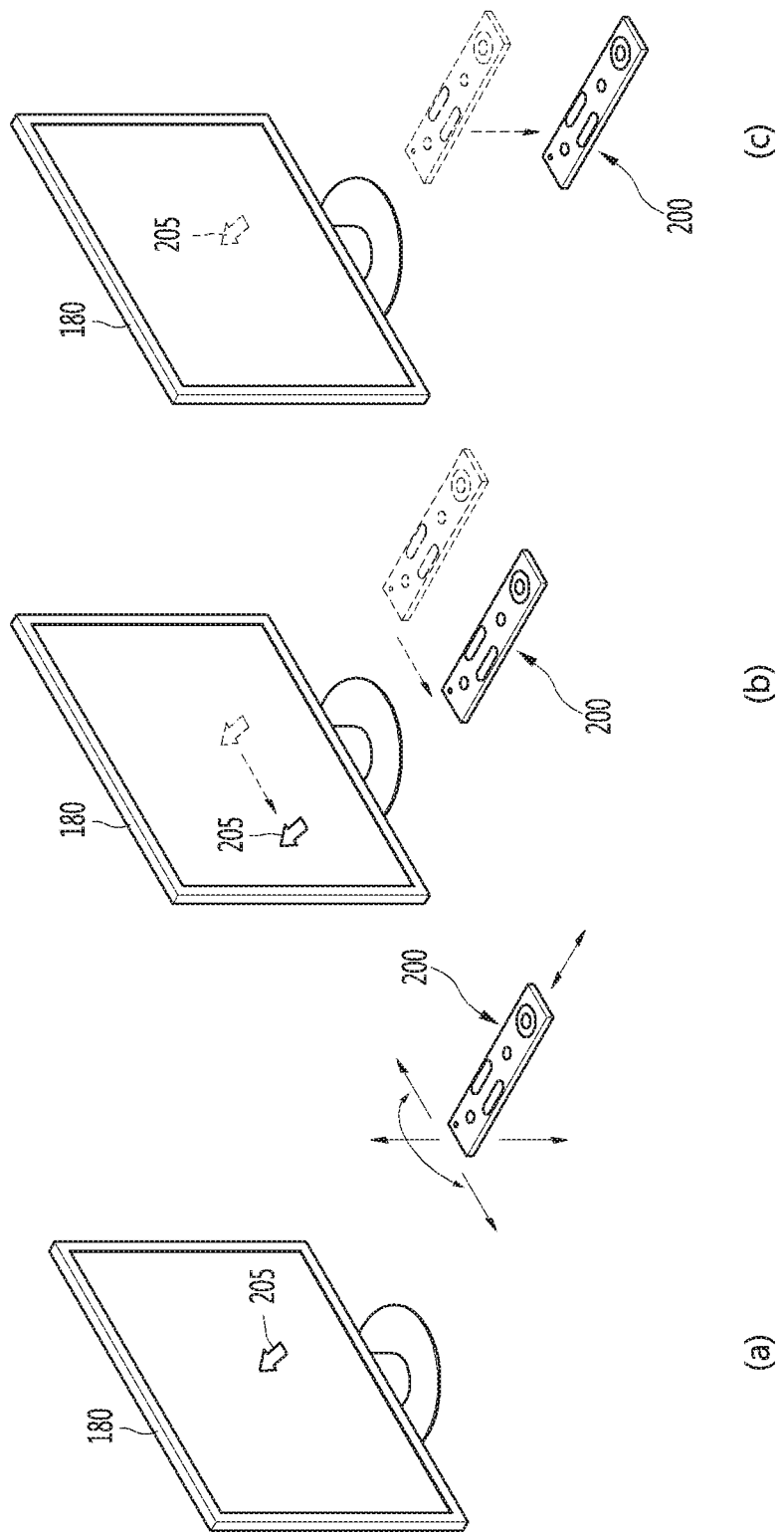
FIG. 4 is a view of utilizing a remote control device according to an embodiment of the present invention.

Next, FIG. 4 is a view of utilizing a remote control device according to an embodiment of the present invention. In particular, FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4(b) illustrates that if a user moves the remote control device 200, the pointer 205 displayed on the display unit 180 of the display device 100 is moved to the left in correspondence thereto. Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 can be zoomed in and displayed largely.

Further, if a user moves the remote control device 200 close to the display unit 180, a selection area in the display unit 180 corresponding to the pointer 205 can be zoomed out and displayed reduced. Further, if the remote control device 200 is away from the display unit 180, a selection area can be zoomed out and if the remote control device 200 is close to the display unit 180, a selection area can be zoomed in.

Also, if a specific button in the remote control device 200 is pressed, the recognition of a vertical or horizontal movement can be excluded. That is, if the remote control device 200 is moved away from or close to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200. Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
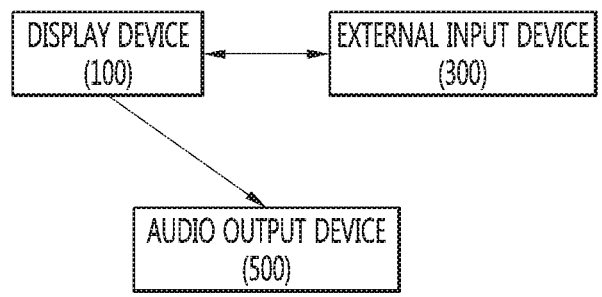
FIG. 5 is a view illustrating a basic configuration of a system according to an embodiment of the present invention.

Next, an operating method of a system according to an embodiment of the present invention will be described with reference to FIG. 5. In particular, FIG. 5 is a view illustrating a basic configuration of a system according to an embodiment of the present invention including a display device 100, an external input device 300, and an audio output device 500.

The display device 100 can be wiredly or wirelessly connected to the external input device 300. The display device 100 can receive at least one of image signal and audio signal output from the external input device 300 through the external device interface unit 135 or the wireless communication unit 173. The display device 100 can output the image signal and audio signal input from the external input device 300.

The audio output device 500 can be wiredly or wirelessly connected to the display device 100. The display device 100 can transmit an audio signal received from the external input device 300 through the external device interface unit 135 or the wireless communication unit 173 to the audio output device 500. Additionally, the display device 100 can include a speaker therein and transmit audio signals to be output to the speaker to the audio output device 500.

Figure 6:
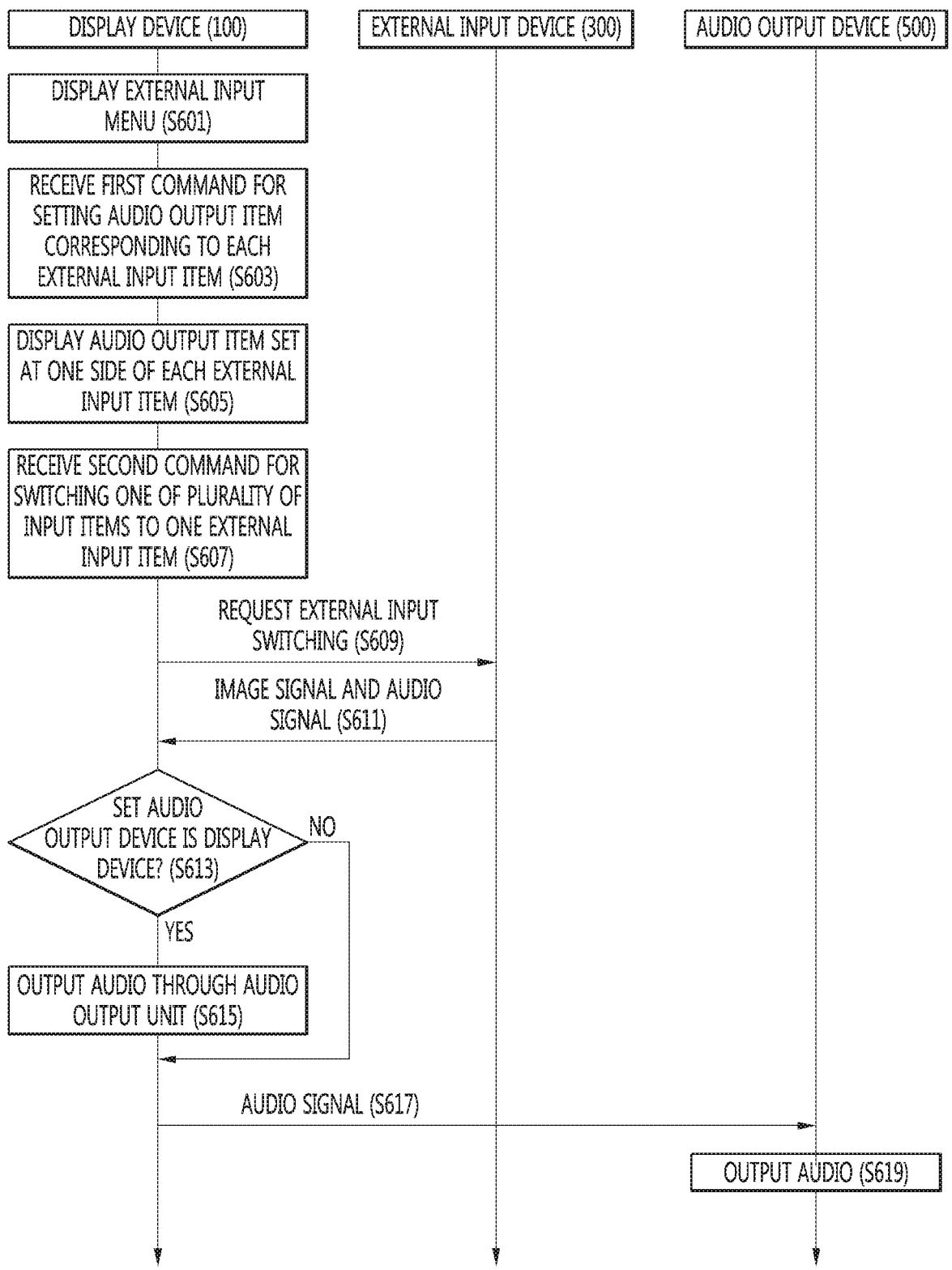
FIG. 6 is a ladder diagram illustrating an operating method of a system according to an embodiment of the present invention.

FIG. 6 is a ladder diagram illustrating an operating method of a system according to an embodiment of the present invention. Referring to FIG. 6, the control unit (controller) 170 of the display device 100 displays a list in operation S601. According to an embodiment, the control unit 170 can receive a request for displaying a list from an external input button provided in the remote control device 200 or a local key provided in the display device 100, and display the list according to the received request. The list is for switching a screen displayed on the display unit 180.

According to an embodiment, the list can be displayed during the playback of an image in media content. An image in media content can be a broadcast image included in a broadcast signal received through the tuner 131 but this is just exemplary. According to an embodiment, the list can include an external input list including information on the external input device connected to the display device 100 and an audio output menu for selecting an audio output device to output an audio signal input from a corresponding external input device. Further, the external input list includes a plurality of external input items and the audio output menu includes a plurality of audio output items.

Each of the plurality of external input items can include information on an external input device connected to the display device 100. For example, each external input item can include at least one of the name of an external input terminal, the name of an external device connected through an external input terminal, and an image based on an image signal received from an external device connected to an external input terminal.

The plurality of audio output items can respectively correspond to the plurality of external input items. Each audio output item can be an item for representing to which audio output device an audio input from an external input device corresponding to each external input item is output. In addition, each audio output item can include at least one information on the name of an audio output device corresponding to a corresponding external input item, the image of an audio output device, and the connection path of an audio output device. The list will be described with reference to FIG. 7.

Figure 7:
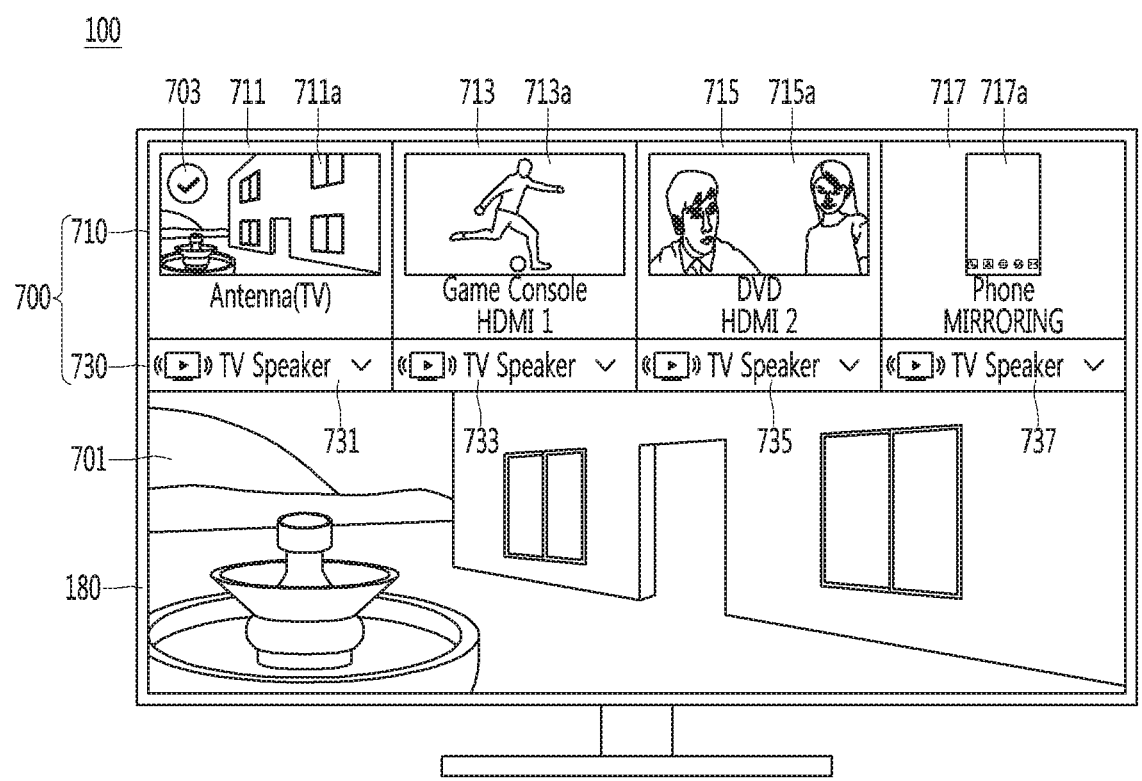
FIG. 7 is a view illustrating a list according to an embodiment of the present invention.

In particular, FIG. 7 is a view illustrating a list according to an embodiment of the present invention. Referring to FIG. 7, the control unit 170 of the display device 100 displays a list 700 while playing an image 701 of a media content through the display unit 180. The list 700 can be displayed overlapping on the image 701 of the media content. The list 700 can be displayed in an On Screen Display (OSD) form. That is, a layer where the list 700 is displayed can be different from a layer where the image 701 of the media content is displayed.

The list 700 can be displayed at the screen upper side and this can be just exemplary. That is, the list 700 can be displayed at one of the lower side, the right side, and the left side. The list 700 can include an external input list 710 and an audio output menu 730. The external input list 710 can include a plurality of external input items 711 to 717. The audio output menu 730 can include a plurality of audio output items 731 to 737.

Each external input item can include information on an external input device connected to the display device 100 through the external device interface unit 135 or the wireless communication unit 173. For example, each external input item can include at least one of the name of an external input terminal, the name of an external input device connected through an external input terminal, and an image based on an image signal received from an external input device connected to an external input terminal.

The first external input item 711 can be an item corresponding to an antenna or tuner 131 provided in the display device 100. In this instance, the first external input item 711 cannot be an external input item strictly. An indicator 703 for representing that the image 701 of the media content is in playback through the current display unit 180 can be displayed on the first external input item 711. That is, the indicator 703 can be an identifier for representing whether an image corresponding to the external input item among the plurality of external input items 711 to 717 is currently in playback through the display unit 180.

A thumbnail image 711a corresponding to one time point of the image 701 of the media content displayed through the display unit 180 can be displayed on the first external input item 711. If the image 701 of the media content is played for more than a predetermined time through the display unit 180, the thumbnail image 711a can be displayed at a position corresponding to an area where the first external input item 711 is disposed. The thumbnail image 711a can be an image captured at a specific time point during the playback of the image 701 of the media content. Although a thumbnail image is described as one example in this present invention, the present invention is not limited thereto. That is, the image 701 of the media content instead of the thumbnail image 711a can be displayed on the first external input item 711 in real time.

The second external input item 713 can be an item for representing that a game console is connected through the HDMI 1 terminal of the external device interface unit 135. At least one of an image based on an input signal input from a game console connected to the display device 100, the name of a game console, and the name of an external input terminal connected to a game console can be displayed on the second external input item 713.

The third external input item 715 can be an item for representing that a DVD device is connected through the HDMI 2 terminal of the external device interface unit 135. At least one of an image based on an image signal input from a DVD device, the name of a DVD device, and the name of an external input terminal connected to a DVD device can be displayed on the third external input item 715.

The fourth external input item 717 can be an item for sharing the screen of a mobile terminal connected through the wireless communication unit 173. That is, the fourth external input item 717 can be an item for representing a screen mirroring function for displaying a screen that a mobile terminal displays currently through the display unit 180. At least one of the name of a mobile terminal connected to the current display device 100 through the wireless communication unit 173 and a capture image for representing a state of capturing a screen that a mobile terminal displays currently can be displayed on the fourth external input item 717.

Each audio output item can include information on an audio output device connected to a display device through the external device interface unit 135 or the wireless communication unit 173. In FIG. 7, the plurality of audio output items 731 to 737 can respectively correspond to the plurality of external input items 711 to 717. Each audio output item can represent to which audio output device an audio signal input from a corresponding external input device is output. FIG. 7 illustrates that each audio output item is set by default. That is, each audio output item can be a speaker item for representing that an audio signal input from each external input device is output to a speaker provided in the display device 100. As described later, an audio output item corresponding to each external input item can vary according to a user's setting.

Referring again to FIG. 6, the control unit 170 of the display device 100 receives a first command for setting an audio output device corresponding to each external input item in operation 5603. That is, the control unit 170 (controller) of the display device 100 can receive a first command for outputting an audio input from an external input device corresponding to each external input item to a specific audio output device 500 connected to the display device 100.

According to an embodiment, a plurality of audio output items can be set in correspondence to one external input item. That is, an audio signal input from one external input device can be set to be output through a plurality of audio output devices. The control unit 170 of the display device 100 displays an audio output item set at one side of each external input item according to a received first command in operation 5605. That is, it is possible to set different audio output items with respect to each external input item.

Operations 5603 to 5605 will be described with reference to the accompanying drawings. In particular, FIGS. 8A and 8B are views illustrating a process for setting an audio output item corresponding to an external input item according to an embodiment of the present invention. Referring to FIG. 8A, the list 700 can include an audio output menu 730. The audio output menu 730 can include a plurality of audio output items 731 to 737.

If a command for selecting a specific audio output item 733 from the plurality of audio output items 731 to 737 is received, the control unit 170 can display an audio output device list 810. According to an embodiment, the audio output menu 810 can include audio output devices that are currently connected to the display device 100 or audio output devices that have previously been connected to the display device 100. According to another embodiment, the audio output device list 810 can include audio output devices that previously output an audio signal input from an external input device corresponding to a corresponding external input item.

If a sound bar item 811 included in the audio output device list 810 is selected, the control unit 170 can immediately set an audio output device 500 corresponding to a second external input item 713 as a sound bar. That is, later, if a command for switching to the second external input item 713 is received, the control unit 170 can immediately transmit an audio input from a game console corresponding to the second external input item 713 to the sound bar. Accordingly, an audio input from a game console can be immediately output transmitted to the sound bar instead of a speaker provided in the display device 100. According to another embodiment, two or more audio output devices can be set in correspondence to one external input item.

Referring to FIG. 8B, if a sound bar item 811 and a speaker item 733 in the audio output device list 810 are selected, the control unit 170 can set the audio output device 500 corresponding to the second external input item 713 as a sound bar and a speaker. That is, later, if a command for switching to the second external input item 713 is received, an audio input from a game console corresponding to the second external input item 713 can be output at the same time through a sound bar and a speaker provided in the display device 100. A multi audio output item 820 can be displayed on the audio output menu 730 in order to represent that audio output devices corresponding to a second external input item 713a are a sound bar and a speaker.

Again, FIG. 6 is described. The control unit 170 of the display device 100 receives a second command for switching to one of a plurality of external input items in operation S607. The second command can be a command for switching an image being played through the display unit 180 to an image output from the external device 300 corresponding to an external input item. According to an embodiment, if one of the plurality of external input items is selected, the control unit 170 can confirm that the second command is received. The control unit 170 can receive the second command from the remote control device 200.

The control unit 170 of the display device 100 requests an external input switch from the external input device 300 corresponding to a corresponding external input item according to the received second command in operation S609. The control unit 170 of the display device 100 receives one of an image signal and an audio signal from the corresponding external input device 300 in response to the external input switch in operation 5611.

If an audio output device corresponding to the external input device 300 of a switching target is set to the display device 100 in operation 5613, the control unit 170 of the display device 100 can output an audio corresponding to an audio signal received from an external input device through the audio output unit 185 provided in the display device 100 in operation S615. According to an embodiment, a case that the external output device 500 corresponding to the external input device 300 that is to be a switching target is set to the display device 100 is a case that the external output device 500 is set to a speaker (more precisely, the audio output unit 185) provided in the display device 100. That is, in this instance, the control unit 170 can output an audio signal input from the external input device 300 to its own speaker.

Moreover, if an audio output device corresponding to the external input device 300 of a switching target is set to another audio output device 500 instead of the display device 100 in operation S613, the control unit 170 of the display device 100 can transmit an audio signal received from the external input device 300 to the audio output device 500 in operation S615. For example, if the audio output device 500 corresponding to the external input device 300 that is a switching target is a sound bar, the control unit 170 can immediately transmit an audio signal input from the external input device 300 to the sound bar through the external device interface unit 135 or the wireless communication unit 173.

Figure 9A:
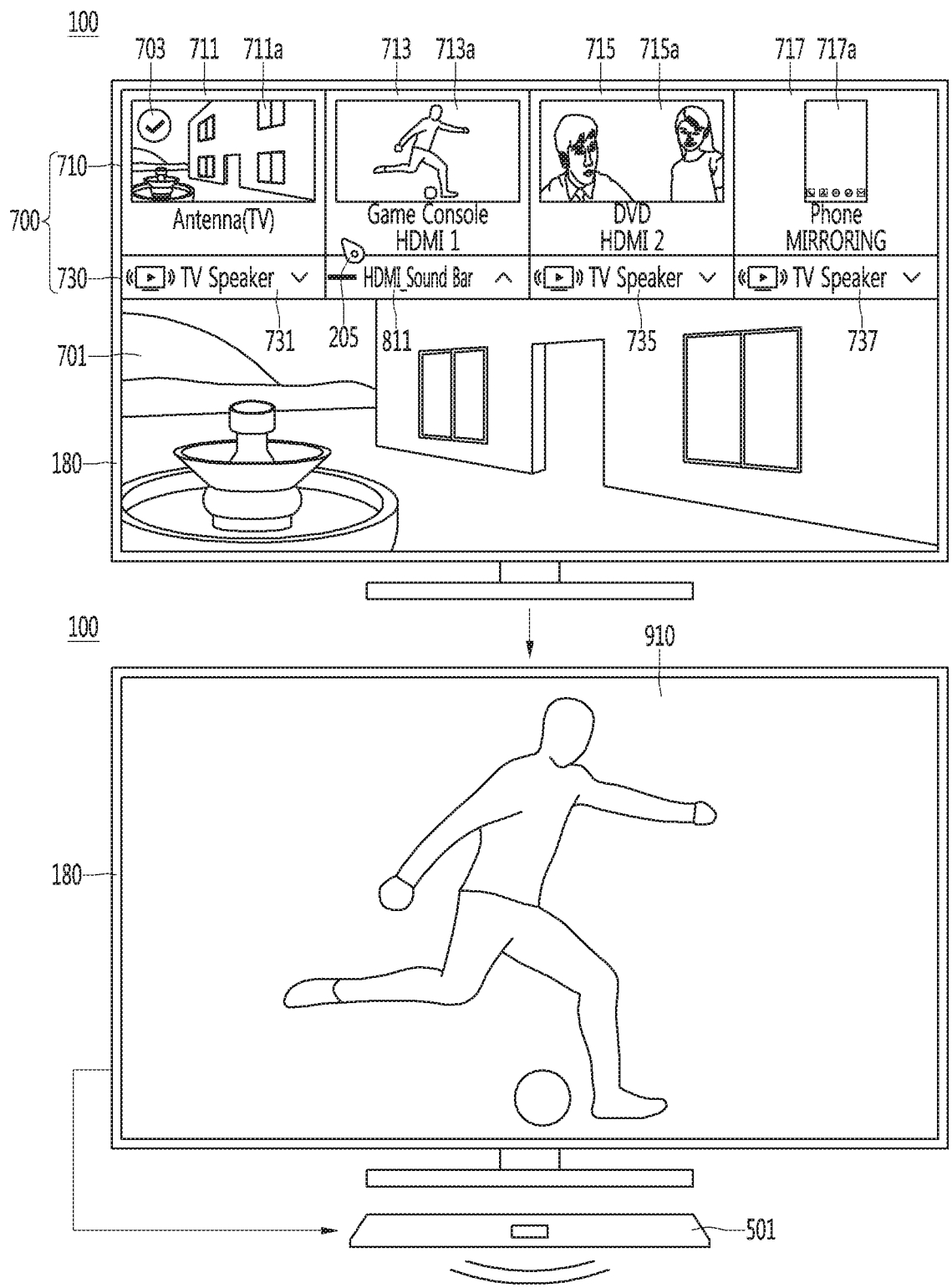
FIGS. 9A to 9C are views of outputting an audio of an external input to an audio output device corresponding to an external input item if switched to the external input according to an embodiment of the present invention.
Figure 9B:
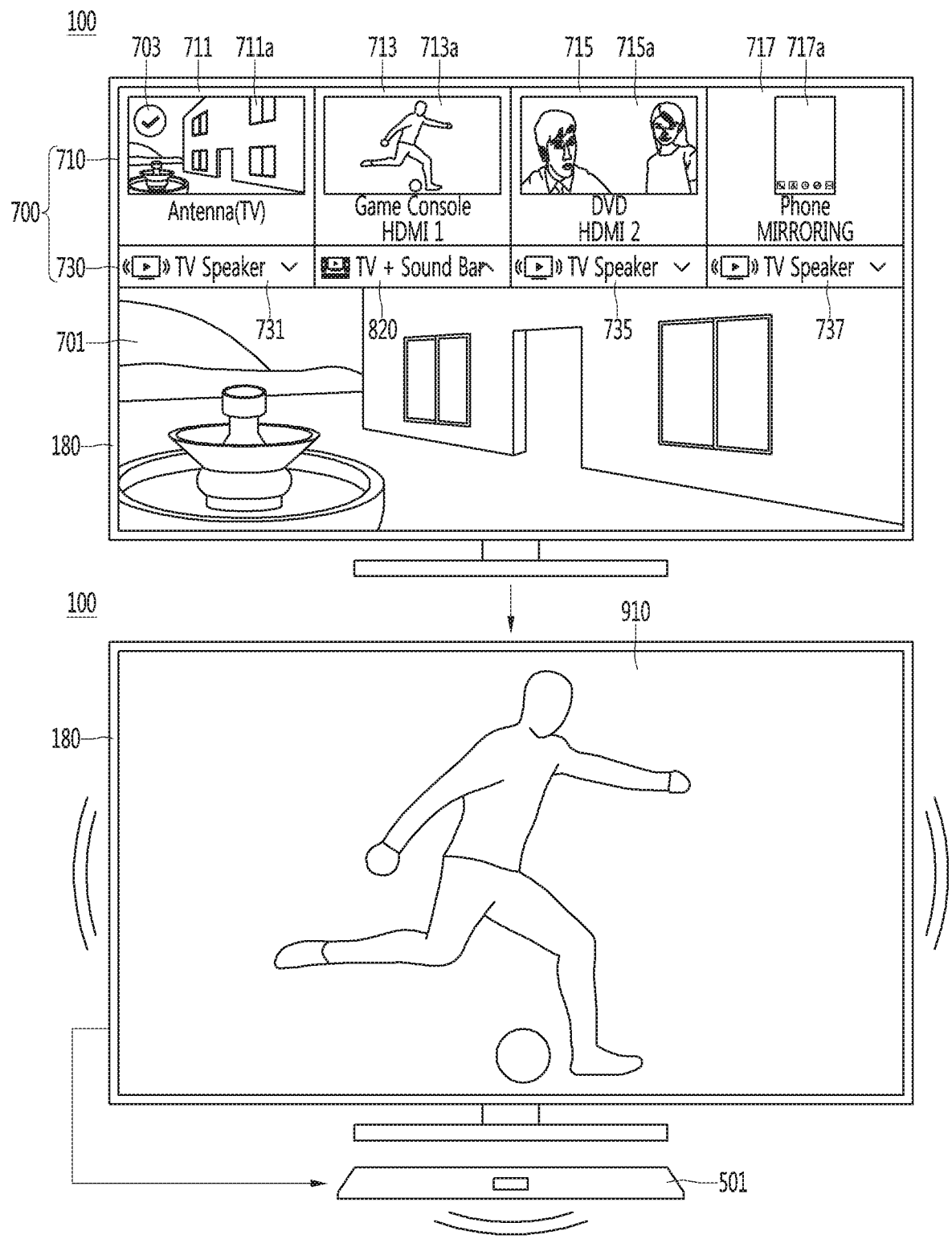
Figure 9C:
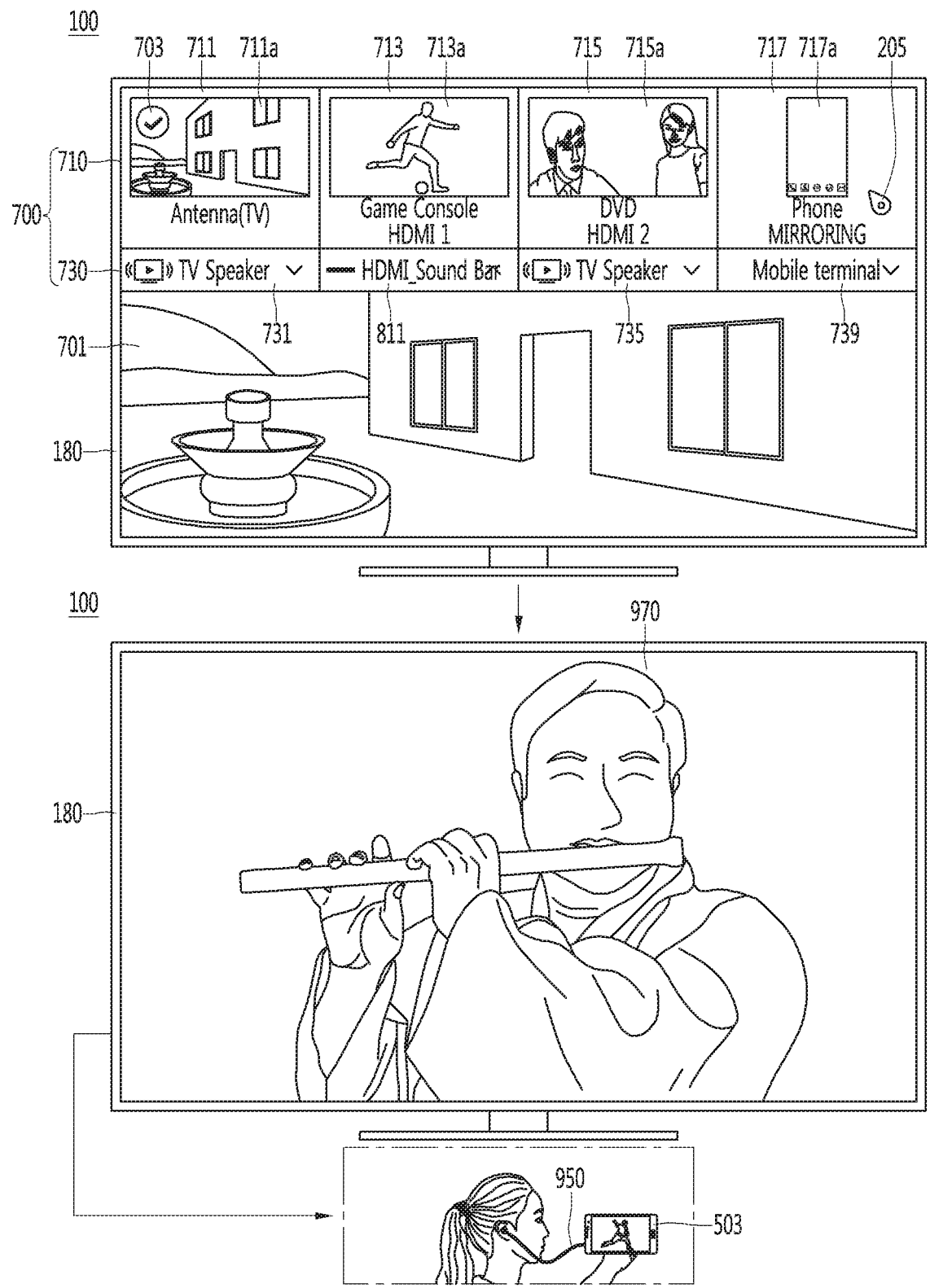

The audio output device 500 outputs an audio corresponding to the received audio signal in operation S619. Operations S607 to S619 will be described with reference to the accompanying drawings. In particular, FIGS. 9A to 9C are views of outputting an audio of an external input to an audio output device corresponding to an external input item if switched to the external input according to an embodiment of the present invention. In FIG. 9A, it is assumed that an audio output device corresponding to the second external input item 713 among a plurality of external input items included in the external input list 710 is set to a sound bar 501.

If a command for switching to the second external input item 713 is received through a pointer 205, the control unit 170, as shown in FIG. 9A, can transmit an audio signal input from a game console corresponding to the second external input item 713 to the sound bar 501. That is, the control unit 170 can transmit an audio signal input from a game console to the sound bar 501 while displaying an image 910 corresponding to an image signal input from the game console through the display unit 180.

In addition, a speaker provided in the display device 100 cannot output an audio signal input from a game console. As a result, an image input from a game console can be displayed through the display unit 180 and an audio input from a game console can be output through the sound bar 501. A user can listen to an audio input from a game console through the sound bar 501 while watching an image input from the game console through the display unit 180.

Then, FIG. 9B is described. In FIG. 9B, it is assumed that an audio output device corresponding to the second external input item 713 among a plurality of external input items included in the external input list 710 is set to the sound bar 501 and a speaker provided in the display device 100. If a command for switching to the second external input item 713 is received through a pointer 205, the control unit 170, as shown in FIG. 9B, can transmit an audio signal input from a game console corresponding to the second external input item 713 to the sound bar 501 and the speaker.

That is, the control unit 170 can transmit an audio signal input from a game console to the sound bar 501 while displaying an image 910 corresponding to an image signal input from the game console through the display unit 180. In addition, a speaker provided in the display device 100 can output an audio signal input from the game console.

As a result, an image input from a game console can be displayed through the display unit 180 and an audio input from a game console can be output through the sound bar 501 and a speaker provided in the display device 100. A user can listen to an audio input from a game console through the sound bar 501 and a speaker provided in the display device 100 while watching an image input from the game console through the display unit 180.

Next, in FIG. 9C, it is assumed that an audio output device corresponding to the third external input item 715 among a plurality of external input items included in the external input list 710 is selected to be a mobile terminal 503 such as a smartphone and a smart pad. That is, an audio output item 739 corresponding to the third external input item 715 can be switched from the TV speaker 735 to the mobile terminal 503.

If a command for switching to the third external input item 715 is received through a pointer 205, the control unit 170, as shown in FIG. 9C, can transmit an audio signal input from a DVD player device corresponding to the third external input item 715 to the mobile terminal 503. That is, the control unit 170 can transmit an audio signal input from a DVD player device to the mobile terminal 503 while displaying an image 970 corresponding to an image signal input from the DVD player device through the display unit 180. In addition, a speaker provided in the display device 100 can not output an audio signal input from a DVD player device. That is, an audio signal input from a DVD player device can be output through only a speaker provided in the mobile terminal 503.

Furthermore, according to another embodiment of the present invention, if an earphone or a headset is connected to the mobile terminal 503, the display device 100 can transmit an audio input from a DVD player device to the mobile terminal 503. That is, even if an external input is switched to the third external input item 715, the display device 100 cannot transmit an audio signal input from a DVD player device to the mobile terminal 503 that is an audio output device corresponding to the third external input item 715. If the mobile terminal 503 is connected to an earphone or a headset, the control unit 170 of the display device 100 can transmit an audio signal input from a DVD player device to the mobile terminal 503.

A user can listen to an audio input from a DVD player device through an earphone or a headset while watching an image input from the DVD player device through the display unit 180. Through this, a user can perform multitasking by manipulating the mobile terminal 503. In addition, since a user listens to an audio input from a DVD player device through only an earphone or headset connected to the mobile terminal 503, it cannot interfere with other users.

Then, an embodiment for registering a new audio output device to the audio output menu 730 is described. FIG. 10 is a view illustrating a process for registering a new audio output device disposed around a display device according to an embodiment of the present invention. Referring to FIG. 10, an audio output device list 810 can further include an item 830 for adding a device other than currently or previously has been connected audio output devices. If the device add item 830 is selected, the control unit 270 can search for audio output devices disposed around the display device 100 and display a search list 1000 including found audio output devices 1010 and 1030.

If a command for adding the new audio output device 1010 is received, the control unit 170 can register the added audio output device 1010 to the audio output device list 810 and display it. Moreover, if a new audio output device other than a previously registered audio output device is found, the display device 100 can display information for representing the new audio output device is found, through the display unit 180.

According to another embodiment of the present invention, in a multi view environment, an audio corresponding to each image can be output to a different audio output device. In particular, FIGS. 11A and 11B are views of outputting the audio of each image to a different audio output device in a multi view environment according to an embodiment of the present invention.

Figure 11A:
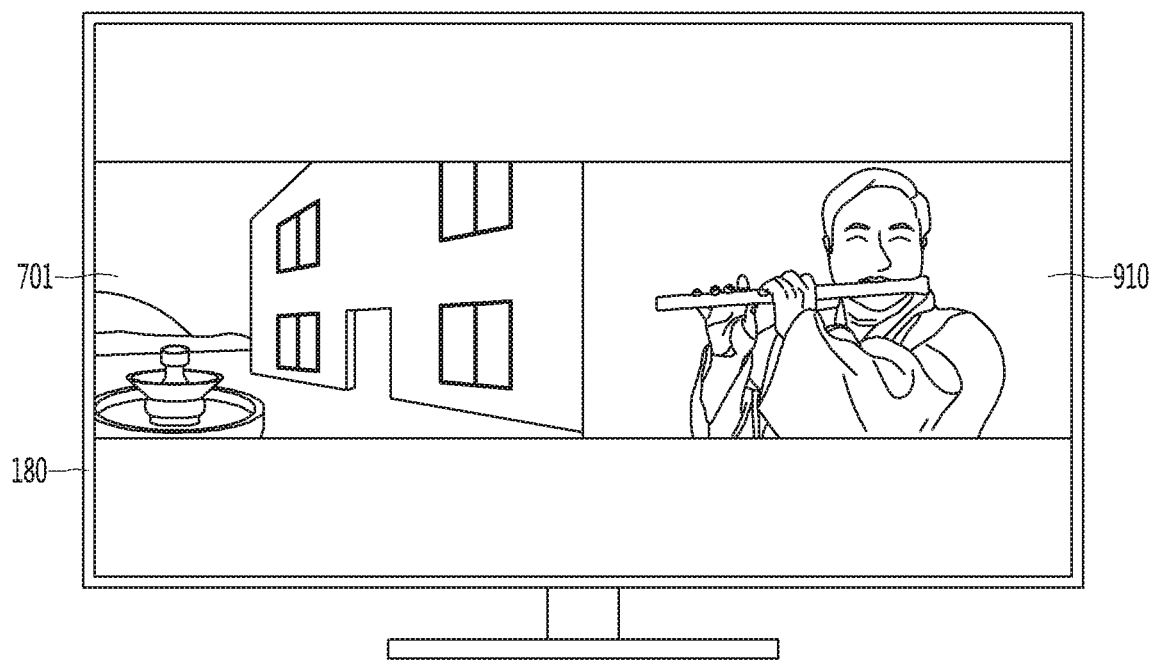
FIGS. 11A and 11B are views of outputting the audio of each image to a different audio output device in a multi view environment according to an embodiment of the present invention.

Referring to FIG. 11A, the display unit 180 of the display device 100 displays, on a divided screen, an image 701 of a media content received from the tuner 131 and an image 910 received through a screen mirroring function of the mobile terminal 503. Additionally, it is assumed that the audio of each image is output through a speaker provided in the display device 100.

Figure 11B:
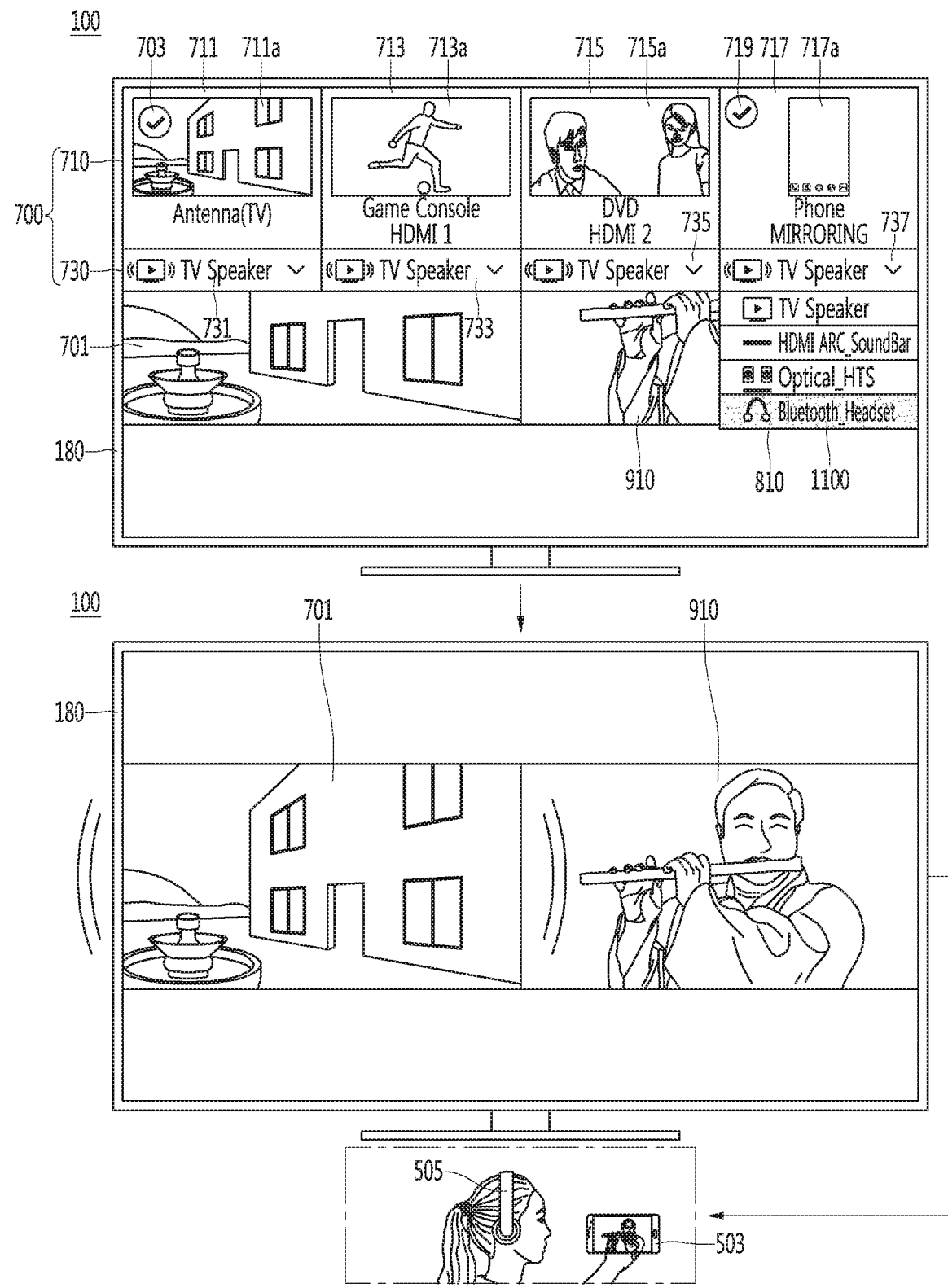

As receiving a command, the control unit 170 can display the list 700 as shown in FIG. 11B. An indicator 703 for representing that the image 701 of the media content is in playback through the current display unit 180 can be displayed on the first external input item 711. In the same manner, an indicator 719 for representing that an image 910 being played by the image terminal 503 is played through the display unit 180 can be displayed on the fourth external input item 717 through a screen mirroring function.

An audio output device corresponding to each of the first external input item 711 and the fourth external input item 717 can be a speaker provided in the display device 100. As shown in FIG. 11B, if an audio output device corresponding to the fourth external input item 717 is changed to a Bluetooth headset item 1100, the control unit 170 can transmit the audio of an image 910 received from the mobile terminal 503 to the Bluetooth headset 505. Accordingly, a speaker provided in the display device 100 can output an audio corresponding to the first external input item 711 and the Bluetooth headset 505 can output an audio corresponding to the fourth external input item 717.

According to another embodiment of the present invention, the display device 100 can recognize the type of an external input device corresponding to each external input item, and automatically set an audio output device appropriate for the recognized type of the external input device. For example, if the recognized external input device is a game console, the display device 100 can automatically set an audio output device corresponding to a game console to a sound bar.

According to another embodiment of the present invention, the display device 100 can automatically set an audio output device based on the type of a media content input through each external input item. For example, a media content input through an external input item is a movie, an audio output device can be set to a sound bar, and if a media content input through an external input item is a song, an audio output device can be automatically set to a Bluetooth headset.

In such a way, according to various embodiments of the present invention, a user can directly set an audio output device corresponding to an external input item, and an audio output device can be set automatically according to the type of an external input device or the type of a media content input through an external input.

According to an embodiment of the present invention, the above-mentioned method can be embodied as computer readable codes on a non-transitory computer readable recording medium having a program thereon. Examples of the computer readable recording medium include ROM, RAM, CD-ROM, magnetic tape, floppy disk, and an optical data storage device and also include carrier waves (e.g., transmission through the Internet).

According to various embodiments of the present invention, by outputting the audio of an external input to a specific audio output device, an audio for user's preference can be provided.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A display device comprising:
   a wireless communication unit;
   a display configured to display a content image;
   a first external device interface configured to receive a first image signal and a first audio signal output from a first external input device;
   a second external device interface configured to receive a second image signal and a second audio signal output from a second external input device; and
   a controller configured to display, on the display, a graphic user interface, the graphic user interface including:
   a first external input item describing at least one of the first external device interface and the first external input device connected to the display device via the first external device interface;
   a second external input item describing at least one of the second external device interface and the second external input device connected to the display device via the second external device interface;
   a first audio output menu for selecting at least one of a plurality of audio output devices for outputting audio included in the first audio signal received from the first external input device; and
   a second audio output menu for selecting at least one of the plurality of audio output devices for outputting audio included in the second audio signal received from the second external input device,
   wherein the first audio output menu corresponds to the first external input item and the second audio output menu corresponds to the second external input item,
   wherein the first audio output menu is displayed at one side of the first external input item and the second audio output menu is displayed at one side of the second external input item, and
   wherein the first audio output menu and the second audio output menu are simultaneously displayed on the graphic user interface.

2. The display device of claim 1, wherein the controller is further configured to:
   display an image corresponding to the first image signal or the second image signal received from the first external input device or the second external input device, respectively, on the display, and
   display the graphic user interface as being overlaid on the displayed image in response to a request from a remote controller.

3. The display device of claim 1, wherein in response to multiple audio output devices being selected from the plurality of audio output devices for the corresponding first or second external input item, the controller is further configured to output the audio included in the first audio signal or the second audio signal input from the respective first external input device or second external input device from the multiple audio output devices.

4. The display device of claim 1, wherein the graphic user interface further includes an add device item for adding at least one specific audio output device, and
wherein, in response to a selection of the add device item, the controller is further configured to display at least one audio output device currently connected to the display device and at least one audio output device previously connected to the display device.

5. The display device of claim 4, wherein the controller is further configured to search for a new audio output device in response to the selection of the add device item and display any found audio output devices.

6. The display device of claim 1, wherein in response to the first external input item and the second external input item being selected, the controller is further configured to display, on a divided screen of the display, a first image included in the first image signal from the first external input device and a second image included in the second image signal from the second external input device, and output the first audio signal corresponding to the first image signal to a first audio output device and output the second audio signal corresponding to the second image signal to a second audio output device.

7. The display device of claim 1, wherein the controller is further configured to:
display a first image corresponding to the first image signal received from the first external input device on the display, and output the first audio signal according to the selected at least one of the plurality of audio output devices,
display the graphic user interface as being overlaid on the displayed first image in response to a request from a remote controller, and
in response to a request for switching to the second external input device, display a second image corresponding to the second image signal received from the second external input device on the display, and output the second audio signal according to the selected at least one of the plurality of audio output devices.

8. A method of controlling a display device, the method comprising:
displaying, via a display, a content image and a graphic user interface, the graphic user interface including:
a first external input item describing at least one of a first external device interface and a first external input device connected to the display device via the first external device interface; a second external input item describing at least one of a second external device interface and a second external input device connected to the display device via the second external device interface;
a first audio output menu for selecting at least one of a plurality of audio output devices for outputting audio included in a first audio signal received from the first external input device; and
a second audio output menu for selecting at least one of the plurality of audio output devices for outputting audio included in a second audio signal received from the second external input device;

wherein the first audio output menu corresponds to the first external input item and the second audio output menu corresponds to the second external input item,
wherein the first audio output menu is displayed at one side of the first external input item and the second audio output menu is displayed at one side of the second external input item, and
wherein the first audio output menu and the second audio output menu are simultaneously displayed on the graphic user interface.

9. The method of claim 8, further comprising:
displaying an image corresponding to the first image signal or the second image signal received from the first external input device or the second external input device, respectively, on the display; and
displaying the graphic user interface as being overlaid on the displayed image in response to a request from a remote controller.

10. The method of claim 8, wherein in response to multiple audio output devices being selected from the plurality of audio output devices for the respective first external input item or second external input item, the method further comprises outputting the audio included in the first audio signal or the second audio signal input from the respective first external input device or the second external input device from the multiple audio output devices.

11. The method of claim 8, wherein the graphic user interface further includes an add device item for adding at least one specific audio output device, and
wherein, in response to a selection of the add device item, the method further comprises displaying at least one audio output device currently connected to the display device and at least one audio output device previously connected to the display device.

12. The method of claim 11, further comprising:
searching for a new audio output device in response to the selection of the add device item and display any found audio output devices.

13. The method of claim 8, wherein in response to the first external input item and the second external input item being selected, the method further comprises displaying, on a divided screen of the display, a first image included in the first image signal from the first external input device and a second image included in the second image signal from the second external input device, and outputting the first audio signal corresponding to the first image signal to a first audio output device and outputting the second audio signal corresponding to the second image signal to a second audio output device.

14. The method of claim 8, further comprising:
displaying a first image corresponding to the first image signal received from the first external input device on the display, and outputting the first audio signal according to the selected at least one of the plurality of audio output devices;
displaying the graphic user interface as being overlaid on the displayed first image in response to a request from a remote controller; and
in response to a request for switching to the second external input device, displaying a second image corresponding to the second image signal received from the second external input device on the display, and outputting the second audio signal according to the selected at least one of the plurality of audio output devices.

* * * * *